United States Patent
Cassetti et al.

(10) Patent No.: US 9,830,189 B2
(45) Date of Patent: *Nov. 28, 2017

(54) MULTI-THREADED QUEUING SYSTEM FOR PATTERN MATCHING

(71) Applicant: Intel Corporation, Santa Clara, CA (US)

(72) Inventors: David K. Cassetti, Tempe, AZ (US); Lokpraveen B. Mosur, Gilbert, AZ (US); Christopher P. Clark, Chandler, AZ (US); Charles A. Lasswell, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 14/981,688

(22) Filed: Dec. 28, 2015

(65) Prior Publication Data
US 2016/0110223 A1    Apr. 21, 2016

Related U.S. Application Data

(63) Continuation of application No. 13/236,877, filed on Sep. 20, 2011, now Pat. No. 9,223,618.

(51) Int. Cl.
*G06F 9/46* (2006.01)
*G06F 9/50* (2006.01)
(Continued)

(52) U.S. Cl.
CPC .......... *G06F 9/5011* (2013.01); *G06F 9/4881* (2013.01); *G06F 13/362* (2013.01); *G06F 17/30985* (2013.01)

(58) Field of Classification Search
None
See application file for complete search history.

(56) References Cited

U.S. PATENT DOCUMENTS 5,361,369 A * 11/1994 Kametani ............... G06F 8/458
718/102
5,809,035 A    9/1998 Sikdar et al.
(Continued)

OTHER PUBLICATIONS

Office Action from related U.S. Appl. No. 12/475,357 dated Apr. 19, 2012, 11 pages.
(Continued)

*Primary Examiner* — Bing Zhao
(74) *Attorney, Agent, or Firm* — Grossman, Tucker, Perreault & Pfleger, PLLC

(57) ABSTRACT

A multi-threaded processor may support efficient pattern matching techniques. An input data buffer may be provided, which may be shared between a fast path and a slow path. The processor may retire the data units in the input data buffer that is not required and thus avoids copying the data unit used by the slow path. The data management and the execution efficiency may be enhanced as multiple threads may be created to verify potential pattern matches in the input data stream. Also, the threads, which may stall may exit the execution units allowing other threads to run. Further, the problem of state explosion may be avoided by allowing the creation of parallel threads, using the fork instruction, in the slow path.

29 Claims, 3 Drawing Sheets

(51) Int. Cl.
    *G06F 9/48*     (2006.01)
    *G06F 17/30*     (2006.01)
    *G06F 13/362*     (2006.01)

(56) References Cited

U.S. PATENT DOCUMENTS

| | | | |
|---|---|---|---|
| 8,168,461 | B2 | 5/2012 | Tsuchiya et al. |
| 8,325,069 | B2 | 12/2012 | Gopal et al. |
| 8,370,274 | B2 | 2/2013 | Cassetti |
| 2005/0108573 | A1 | 5/2005 | Bennett et al. |
| 2005/0172088 | A1 | 8/2005 | Klingman |
| 2005/0193137 | A1 | 9/2005 | Farnham |
| 2006/0050968 | A1 | 3/2006 | Oh et al. |
| 2006/0075206 | A1 | 4/2006 | Bouchard et al. |
| 2006/0259571 | A1 | 11/2006 | Talluri et al. |
| 2007/0016907 | A1 | 1/2007 | Benedetti et al. |
| 2007/0124146 | A1 | 5/2007 | Lunteren |
| 2008/0133518 | A1 | 6/2008 | Kapoor et al. |
| 2008/0222116 | A1 | 9/2008 | Bass et al. |
| 2010/0161536 | A1 | 6/2010 | Clark et al. |
| 2010/0169401 | A1 | 7/2010 | Gopal et al. |
| 2010/0211571 | A1 | 8/2010 | Prahlad et al. |
| 2010/0260187 | A1 | 10/2010 | Ongole et al. |
| 2010/0306263 | A1 | 12/2010 | Cassetti et al. |
| 2011/0145205 | A1 | 6/2011 | Jain et al. |
| 2012/0150887 | A1 | 6/2012 | Clark et al. |

OTHER PUBLICATIONS

Notice of Allowance from related U.S. Appl. No. 12/475,357 dated Sep. 28, 2012, 10 pages.
Final Office Action from related U.S. Appl. No. 12/637,488 dated Oct. 1, 2012, 12 pages.
International Search Report and the Written Opinion from related Application No. PCT /US2012/054646, dated Feb. 25, 2013, 11 pages.
Office Action from related U.S. Appl. No. 12/637,488 dated Mar. 13, 2012, 16 pages.
Becchi, Michela "Data Structures, Algorithms and Architectures for Efficient Regular Expression Evaluation", A dissertation presented to the Graduate School of Arts and Sciences of Washington University in partial fulfillment of the requirements for the degree of Doctor of Philosophy, Saint Louis, Missouri, May 2009, 193 pages.
Aho, et al., "Efficient String Matching: An Aid to Bibliographic Search", Communications of the ACM, vol. 18, No. 6, Jun. 1975, pp. 333-340.
Final Office Action received for U.S. Appl. No. 12/637,488, dated Sep. 19, 2013, 15 pages.
Office Action received for U.S. Appl. No. 12/637,488, dated Jul. 25, 2013, 13 pages.
International Preliminary Report on Patentability and Written Opinion received for PCT Patent Application No. PCT/US2012/054646, dated Apr. 3, 2014, 6 pages.
Notice of Allowance issued in U.S. Appl. No. 13/236,877, dated Aug. 19, 2015, 5 pages.
Office Action issued in U.S. Appl. No. 13/236,877, dated Oct. 22, 2013, 17 pages.
Office Action issued in U.S. Appl. No. 13/236,877, dated Jan. 28, 2015, 9 pages.
Final Office Action issued in U.S. Appl. No. 13/236,877, dated Mar. 12, 2014, 12 pages.

* cited by examiner

MULTI-THREADED QUEUING SYSTEM FOR PATTERN MATCHING

REFERENCE TO PRIORITY APPLICATION

This application is a Continuation of U.S. patent application Ser. No. 13/236,877 filed 20 Sep. 2011, which is incorporated herein by reference in its entirety.

BACKGROUND

The present computer systems may use hybrid approaches to solve the pattern matching problem. One such hybrid approach includes using a fast path to determine if there exists a potential matching pattern in information units and then sending the information unit to a slow path for much deeper analysis to determine if there exists a matching pattern in the information units. The computer systems may include a list of patterns (or signatures) and the information units are compared with the list of patterns to determine if there exists a matching pattern in the information units. When the fast path detects a potential match, typically, the information unit is forwarded to the slow path for deeper analysis or verification. However, forwarding the information unit to the slow path results in a data copy (duplicate) for each potential match in the fast path. A data copy may refer to copying a significant amount of data, for example, entire packet and/or the data surrounding (for instance preceding) the packet. Further, for deterministic finite automaton (DFA) based architectures, a single threaded approach may be used and such an approach may suffer from state explosion for large regular expression databases and single problematic regular expressions such as /abc.*ef.{256}gh/. Also, for multi-threaded architectures, an instruction or data fetch may, typically, result in a stall by the execution engine that may result in reduced performance.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
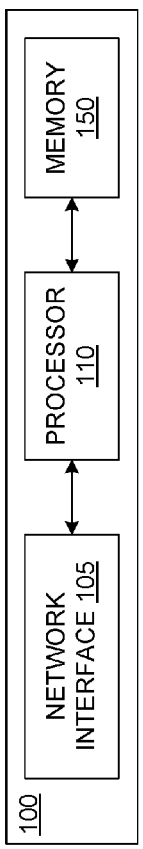
FIG. 1 illustrates a pattern matching device 100, which may support multi-threaded queuing system for pattern matching according to an embodiment.

The following description describes a multi-threaded queuing system for pattern matching. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of signals. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

In one embodiment, the processor supporting a multi-threaded queuing system for pattern matching may enhance the data management and execution efficiency. In one embodiment, the processor may support creation of multiple threads, which may be used to verify potential pattern matches in the input data stream. In one embodiment, the processor may include an input data buffer, a fast path, a safety position logic, a slow path, a job pool, a job pool arbiter, a feedback queue arbiter, a scheduler arbiter, a bus master interface, a bus master, a job scheduler, a plurality of feedback queues, and a plurality of execution units.

In one embodiment, the processor may receive input data units from a network interface, for example, and the input data may be written to the input data buffer if the input data is not full. In one embodiment, the fullness of the input data may be determined by a write position and a minimum read position determined by the safety position logic. In one embodiment, a minimum position may refer to a minimum position at which a given job may request input data. In one embodiment, the minimum read position determined by the safety position logic may refer to the minimum position among all the jobs in the system. In one embodiment, the fast path may scan the input data, sequentially, and create a job in response to detecting a potentially matching pattern and stores the job into a new job queue. In one embodiment, the fast path may generate a potentially matching pattern if at least a portion of the input data unit matches with at least a standard pattern(s) (signatures) stored in a memory, or a cache, or a content addressable memory, with the processor. In one embodiment, the slow path may retrieve the job from the new job queue and process the job. In one embodiment, new job queue may be granted by the job pool arbiter and the job pool arbiter may further request instructions from the bus master and data from the input data buffer. In one embodiment, the job pool arbiter may provide the index for the return instructions to the bus master and the index for the return data to the scheduler. In one embodiment, the job pool arbiter may write (or store) the job state to the job pool so that the position may be tracked by the safety position logic. The job pool arbiter may support accessing of jobs in the job pool.

In one embodiment, the scheduler may receive a data return event from the job pool arbiter and the instruction return event from the bus master. In one embodiment, the scheduler may include a scheduler arbiter, which may determine that the job is ready-to-run if the data and instructions for that job are readily available. In one embodiment, the scheduler arbiter may add the job index into a ready-to-run queue. In one embodiment, the scheduler arbiter may send the job (i.e., state, instructions, and data) to the execution unit based on the availability of the execution units. In one embodiment, each execution unit may include one or more input and output queues and the job may be stored into one of the input queues within the execution unit. In one embodiment, the execution unit may process the job for one or more clock cycles using the instruction and data stored locally. In one embodiment, the processing of the job may create one or more additional jobs and such additional jobs may be stored into a fork queue. In one embodiment, the job may eventually exit the execution unit and the job may exit based on one or more of the following events: 1) to terminate a job that failed to find a pattern match (job index is returned to the free list); 2) job may require more data; 3) job may require more instructions; and 4) job may be stalled for more input data from the input data buffer. In one embodiment, the stalled threads (or jobs), if any, may exit the execution engines and allow the other threads to be processed.

In one embodiment, the execution unit may accept other scheduled job for processing quickly, for example, in the very next clock cycle. In one embodiment, the feedback queue arbiter may cause the exiting jobs (exiting the execution unit) to enter one of the corresponding feedback queues. In one embodiment, the feedback queue arbiter may return the index of a free job to a free list FIFO (first-in-first-out memory, for example) for the terminated jobs and for the jobs that may be sent to the overflow queue. In one embodiment, the feedback queue arbiter may service the jobs in the feedback queue and new jobs from the fast path. In one embodiment, the jobs, which may be out of input data buffer may not require new instructions and may pass jobs that may be stalled if the number of in-flight requests has currently been exceeded. In one embodiment, the feedback queue arbiter may arbitrate the incoming access requests to the feedback queues, especially, if more than one execution units attempt to access the same feedback queue.

An embodiment of a pattern matching device 100 is illustrated in FIG. 1. In one embodiment, the pattern matching device 100 may represent a client system, router, or a server, or any such computing device. In one embodiment, the pattern matching device 100 may represent a desktop computer system, a laptop computer system, a personal digital assistant, a mobile phone, or any such computing system. In one embodiment, the pattern matching device 100 may include a network interface 105, a processor 110, and a memory 150.

In one embodiment, the pattern matching device 100 may receive one or more data units and may determine, for example, if the data units include one or more patterns (or signatures) stored in a database within the pattern matching device 100. The network interface 105 may transfer one or more data units to the processor 110. Also, the processor 110 may access data and instructions stored in the memory 150. In one embodiment, the processor 110 may support a multi-threaded queuing system for pattern matching to enhance the data management and execution efficiency. In one embodiment, the processor 110 may support creation of multiple threads, which may be used to verify potential pattern matches in the input data stream. In one embodiment, the memory 150 may store packets and packet related information that may be used by the processor 110 to determine the matching pattern. In one embodiment, the memory 150 may comprise a dynamic random access memory (DRAM) and a static random access memory (SRAM).

Figure 2:
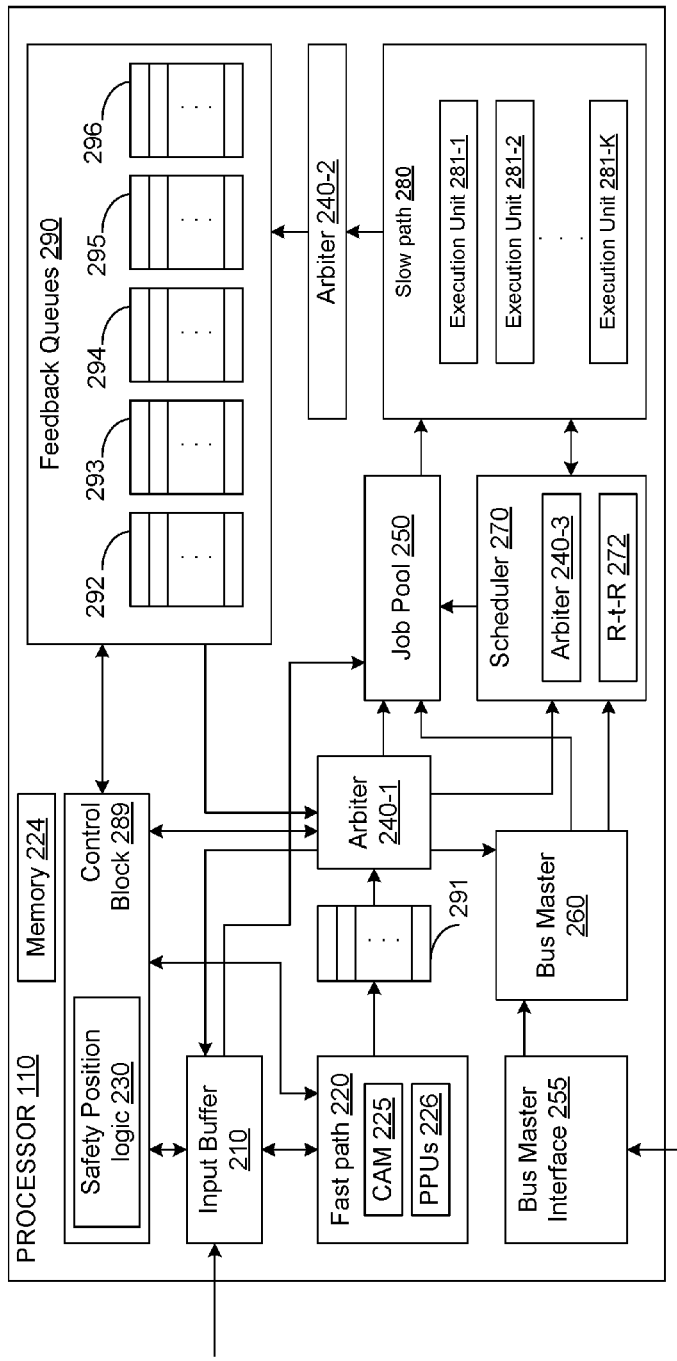
FIG. 2 illustrates a processor 110, which may support multi-threaded queuing system for pattern matching according to an embodiment.

An embodiment of the processor 110 is illustrated in FIG. 2. In one embodiment, the processor 110 may include an input data buffer 210, a fast path 220, a safety position logic 230, a job pool arbiter 240-1 and a feedback queue arbiter 240-2, a job pool 250, a bus master interface 255, a bus master 260, a job scheduler 270, a slow path 280 including a plurality of execution units 281, a plurality of feedback queues 290, and a control block 289.

In one embodiment, control unit 289 may store the input data units in the input data buffer 210 based on a fullness signal provided by the safety position logic 230. In one embodiment, the input data units may be stored in the input data buffer 210 if the input data buffer 210 is not full. In one embodiment, the fullness of the input data buffer 210 may be determined based on a minimum read position signal. In one embodiment, the control unit 289 may include a safety position logic 230. In one embodiment, the safety position logic 230 may provide a minimum read position signal to the input data buffer 210 and based on the minimum read position signal the fullness of the input data buffer 210 and the input data units that may be retired or removed from the input data buffer 210 may be determined.

In one embodiment, the safety position logic 230 may receive a first position, representing a position of the data units in the fast path 220. In one embodiment, the safety position logic 230 may scan the job pool 250 and the fork queue 292 to, respectively, read a second and third position value. In one embodiment, the safety position logic 230 may receive a fourth position, representing the head entry of the overflow queue 293. In one embodiment, the safety position logic 230 may compare the first, second, third, and the fourth position values and scanning may be performed on a continuous stream of safety position values generated after comparing the safety position values and momentary false values, which may occur while jobs are in transit between different portions of the processor 110. In one embodiment, the safety position logic 230 may then generate a minimum read signal, which may be provided to the input data buffer 210. In one embodiment, control block 289 may also use the minimum position read signal to retire or remove some data units from the input data buffer 210. In one embodiment, the input data units, which may be retired or removed from the input data buffer 210 may not be protected by the safety positions any longer or may no longer be used.

In one embodiment, the position values may provide information about which input data units may be required by the fast path 220 or the slow path 280 and those data units, which may not be required, may be retired or deleted from the input data buffer 210. In one embodiment, the control unit 289 may check the status of the data units, for example, at regular intervals of time. In other embodiment, the control unit 289 may check the data units stored in the input data buffer 210 if the number of data units stored in the input data buffer reaches a fraction of the total capacity (i.e., fullness) of the input data buffer 210. In one embodiment, sharing the input data buffer 210 and retiring the non-required data units may avoid creating a copy of the input data unit and providing the copy of the input data unit to the slow path every time the fast path 220 determines a potential match in the pattern.

Also, in one embodiment, the input data buffer 210 may be shared between the fast path 220 and the slow path 280. In one embodiment, as a result of sharing the input data buffer 210 between the fast path 220 and the slow path 280 and removing the non-required input data units from the input data buffer 210, creating a copy of the input data units may be avoided.

In one embodiment, the feedback queues 290 may include a fork queue 292, a stalled jobs queue 293, an overflow queue 294, an instruction queue 295, and a free list queue 296. In one embodiment, the fork queue 292 may store newly created (fork) jobs and these jobs may have the highest priority. In one embodiment, the stalled jobs queue 293 may store the jobs to fetch data from the input data buffer 210 and these jobs may pass the jobs that are stalled for requiring the information from the bus master 260. In one embodiment, the overflow queue 294 may store the jobs that have run out of data in the input data buffer 210 and the overflow jobs may be saved and may be restored for packet spanning at a later point in time. In one embodiment, the instructions queue 295 may store instructions jobs, which may fetch more instructions from the bus master 260. In one embodiment, the free-list queue 296 may provide the arbiter 240 an index of a free entry in the job pool 250 and the exiting or terminating jobs may return their index to the free-list queue 296 for reuse.

In one embodiment, the fast path 220 may scan the input data to determine if the input data unit includes a pattern, which matches with one or more of the patterns stored in a cache memory 224 or some other such memory provided within the processor 110. In other embodiment, a list of the patterns may be stored in a content addressable memory CAM 225, which may be provided within the fast path 220 and the input data unit or portions thereof may be provided as a key to the content addressable memory 225. In one embodiment, the fast path 220 may include one or more programmable processing units PPUs 226, which may process or scan the input data units stored in the input data buffer 210 to determine if the input data unit, potentially, includes a matching pattern.

In one embodiment, the fast path 220 may create a job in response to detecting a potentially matching pattern in the input data unit. In one embodiment, the fast path 220 may store the job into a new job queue 291.

In one embodiment, the job pool arbiter 240-1 may grant or allocate a job from the new job queue 291 to one of the available execution units 281. In one embodiment, the job pool arbiter 240-1 may further send a first request to the bus master 260 to receive instructions to enable processing of that job. In one embodiment, the job pool arbiter 240-1 may send a second request to the control block 289, which may cause the input data units in the input data buffer 210 associated with the allocated jobs to be provided to the job pool 250 under the supervision of the job pool arbiter 240-1. In one embodiment, the job pool arbiter 240-1 may then provide a first index for the return instructions to the bus master 260 and a second index for the return data to the scheduler 270. In one embodiment, the arbiter pool arbiter 240-1 may write (or store) the job (i.e., the data, instructions, and the state) to the job pool 250 and the position may be tracked by the safety position logic 230.

In one embodiment, the feedback queue arbiter 240-2 may be provisioned between the slow-path 280 and the feedback queue 290. In other embodiment, the feedback queue arbiter 240-2 may be provisioned in the slow-path 280. In yet other embodiment, the feedback queue arbiter 240-2 may be provided within the feedback queue 290. In one embodiment, the feedback queue arbiter 240-2 may cause the exiting jobs (exiting one of the execution unit 281 of the slow path 280, for example) to enter one of the corresponding feedback queues 292, 293, 294, 295, and 296. In one embodiment, the feedback queue arbiter 240-2 may return the index of a free job to a free list FIFO (first-in-first-out memory, for example) for the terminated jobs and for the jobs that may be sent to the overflow queue 293. In one embodiment, the feedback queue arbiter 240-2 may service the jobs in one of the feedback queue 292-296 and new jobs from the fast path 220. In one embodiment, the jobs from the stalled jobs queue 293 that require data from the input data buffer 210 do not require new instructions and may pass the jobs that may be stalled. In one embodiment, the feedback queue arbiter 240-2 may arbitrate the incoming access requests to the feedback queues 292-296, especially, if more than one execution units 281 attempt to access the same feedback queue.

In one embodiment, the job pool 250 may store the state of the jobs, the instruction used for performing the jobs, and the data used by the jobs. In one embodiment, the job state may include an instruction pointer and a current position in the data stream. In one embodiment, the instruction pointer and the current position may be used to accurately identify the job state in the job pool 250.

In one embodiment, the scheduler 270 may include a scheduler arbiter 240-3 and a ready-to-run (R-t-r) queue 272. In one embodiment, the scheduler 270 may receive a data return event from the job pool arbiter 240-1 and the instruction return event from the bus master 260. In one embodiment, the scheduler arbiter 240-3 may determine that the job may be ready to run if the data and instructions for that job are readily available. In one embodiment, the scheduler 270 may add the job index into a ready-to-run (R-t-R) queue 272. In one embodiment, the job (i.e., state, instructions, and data) may be sent to the execution unit based on the availability of the execution units 281-1 to 281-K.

Figure 5:
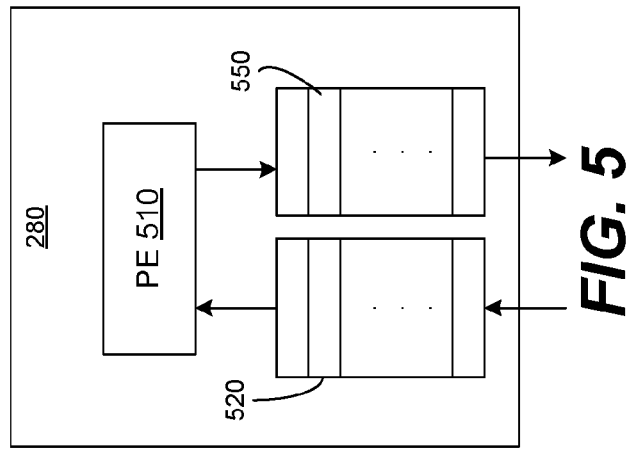
FIG. 5 illustrates an execution unit 270, which may be used to perform the jobs stored in the job state or one or more feedback according to an embodiment.

In one embodiment, the slow path 280 may include one or more execution units 281-1 to 281-K. In one embodiment, an execution unit 281-2, which may be free to process a job, for example, may receive a job from the R-t-R 272 and may process the job. In one embodiment, the job, which may be ready-to-run may be transferred from the R-t-R 272 to the available execution unit 281. In one embodiment, each execution unit 281 may include a processing element 510, an input queue 520 and an output queue 550 as depicted in FIG. 5. In one embodiment, each entry in the input queue 520 may include input data unit, job state, and input instructions. In one embodiment, the input queue 520 may store 1 to 8 instructions. In one embodiment, the output queue 550 may be receive the executed jobs and the output queue 550, for example, may be shallow or of lesser size. In one embodiment, the processing unit 510 of the execution unit 281-2 may process the job for one or more clock cycles using the instruction and the data stored in the input queue 520. In one embodiment, processing element 510 while processing the job may create one or more additional jobs and such additional jobs may be stored into a fork queue 292 of the feedback queues 290.

In one embodiment, the job may eventually exit the execution unit 280-2 and the job may exit based on one or more of the following events: 1) to terminate a job that failed to find a pattern match (job index is returned to the free list); 2) job may require more data; 3) job may require more instructions; and 4) job may be stalled for requiring more input data from the input data buffer. In one embodiment, the stalled threads (or jobs), if any, may exit the execution unit 281-2 (or the slow path 280, in general) and allow the other threads to be processed. In one embodiment, the exited job may be allocated to one of the feedback queues 290.

In one embodiment, the execution unit 281-2 may accept other scheduled job for processing quickly, for example, in the very next clock cycle. In one embodiment, the exiting jobs (exiting the execution unit 281-2, for example) may be caused (by the feedback queue arbiter 240-2) to enter the queue 293.

In one embodiment, as a result of sharing the input data buffer 210 between the fast path 220 and the slow path 280 and by providing a technique to retire the data units in the input data buffer 210 that are not needed and thus avoiding copying the data unit used by the slow path 280. In one embodiment, the data management and the execution efficiency may be enhanced as multiple threads may be created to verify potential pattern matches in the input data stream. In one embodiment, the threads, which may stall may exit the execution units 280 allowing other threads to run. Further, in one embodiment, the problem of state explosion may be avoided by allowing the creation of parallel threads, using the fork instruction, in the slow path 280.

Figure 3:
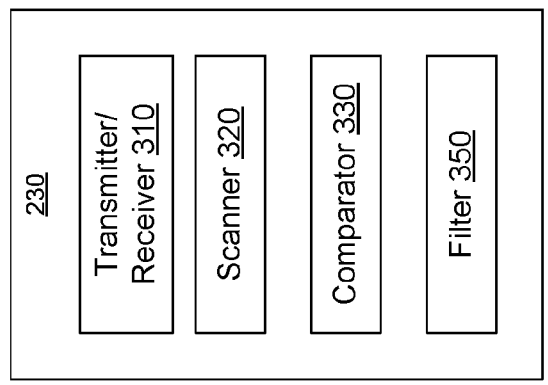
FIG. 3 illustrates a safety positioner 230, which may determine the fullness of an input buffer according to an embodiment.

An embodiment of the safety position logic 230 is illustrated in FIG. 3. In one embodiment, the safety position logic 230 may include a transmitter/receiver 310, a scanner 320, a comparator 330, and a filter 350. In one embodiment, the transmitter/receiver 310 may receive a first position in response to scanning the position of the data units in the fast path 220, a second position in response to scanning the position in the job pool 250, the third position in response to scanning the fork queue 292, and the fourth position in response to receiving the head entry of the overflow queue 293. In one embodiment, the entries in the overflow queue 293 may be ordered according to the least position by the feedback queue arbiter 240-2 such that the head entry may be guaranteed to have the minimum position. In one embodiment, the comparator 330 may compare the first, second, third, and the fourth position values. In one embodiment, the scanner 320 may scan the fast path 220, the job pool 250, the fork queue 292, and the overflow queue 293. In one embodiment, the scanning may be performed on a continuous stream of safety position values generated after comparing the safety position values. In one embodiment, the filter 350 may filter the momentary false values, which may occur while jobs are in transit between different portions of the processor 110. In one embodiment, the output of the filter 350 may be used to generate a minimum read signal, which may be provided to the input data buffer 210.

Figure 4:
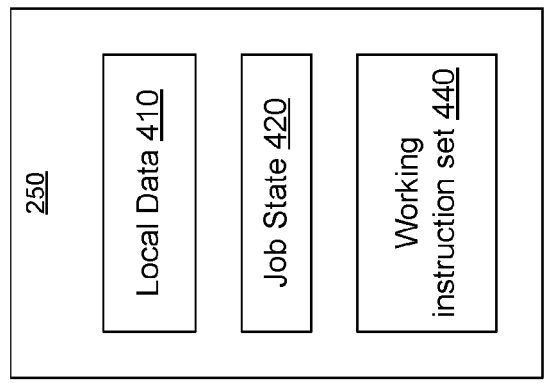
FIG. 4 illustrates a job pool 240, which may be used to store job states according to an embodiment.

An embodiment of a job pool 250 is illustrated in FIG. 4. In one embodiment, the job pool 250 may include a local data 410, a job state 420, and a working instruction set 440.

In one embodiment, the job pool 250 may store the state of the jobs (i.e., job state) in the job state 420, the instructions for the jobs in the working instruction set 440, and the data used by the jobs in the local data 410. In one embodiment, the job state 420 may include a first index portion and a state portion and the first index portion may be used as a write address for the job state 420 and the state portion of the job state may be provided by the job pool arbiter 240-1. In one embodiment, the first index may be obtained by the job pool arbiter 240-1 from the free-list queue 296. In one embodiment, the local data 410 may include a second index portion, which may be used as a write address for the local data 410. In one embodiment, the second index portion of the local data 410 may be provided by the scheduler 270 and a data portion may be provided by the input data buffer 210. In one embodiment, the working instruction set 440 may include a third index portion, instruction portion and an address portion. In one embodiment, the third index portion may be used as a write address for instruction set 440. In one embodiment, the third index portion and the instruction portion may be provided by the bus master 260 and the address portion may be provided by the scheduler 270. In one embodiment, the address portion may represent a read address and the read address may be provided to job pool (i.e., the local data 410, the job state 420, and the write instruction set 440). In one embodiment, the instructions may also include an instruction pointer and a current position, which may be a portion of the job state 420. In one embodiment, the instruction pointer and the current position may be used to accurately identify the job state 420 in the job pool 250.

Figure 6:
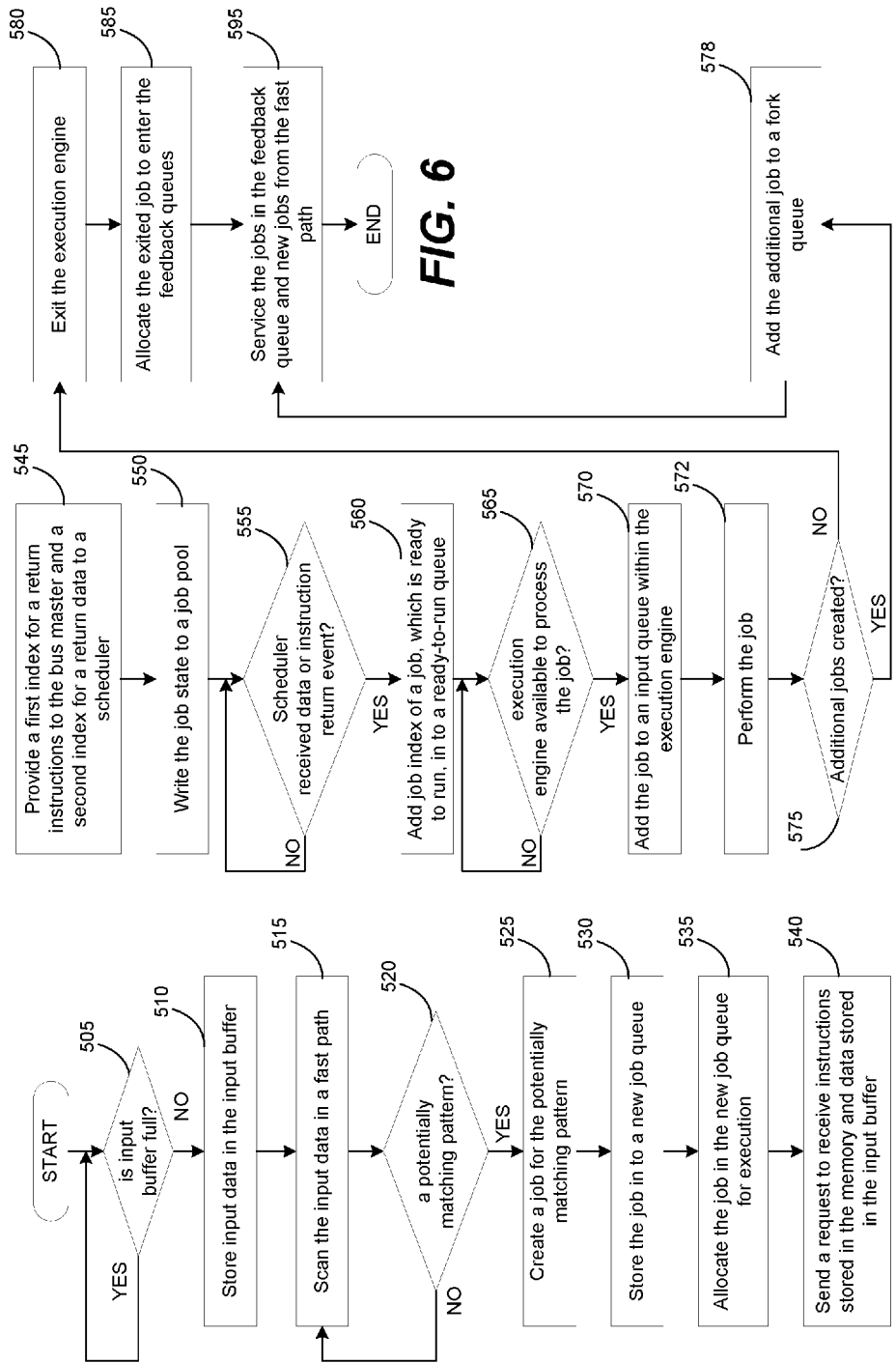
FIG. 6 depicts a flow-chart illustrates an embodiment of the processor 110, which may support multi-threaded queuing system for pattern matching.

An embodiment of the processor 250 that may perform pattern matching task is illustrated in FIG. 6. In block 505, the control block 289 may check the fullness of the input data buffer 210 and control passes to block 510 if the input data buffer 210 is not full and control may loop back otherwise. In one embodiment, the fullness of the input data buffer 210 may be determined, by the safety position logic 230 provided within the control block 289, based on a minimum read position signal.

In block 510, the control block 289 may store the input data unit (s) to be stored in the input data buffer 210. In block 515, the fast path 220 may scan the input data units in the input data buffer 210. In block 520, the fast path 220 may determine if the input data unit(s), potentially, includes a matching pattern and control passes to block 525 and to block 515 otherwise.

In block 525, the fast path 220 may create a job in response to detecting a potentially matching pattern in the input data unit. In block 530, the fast path 220 may store the job in a new job queue 291. In block 535, the job pool arbiter 240-1 may allocate the job stored in the new job queue 291 for execution. In block 540, the job pool arbiter 240-1 may send a first request to the bus master 260 to receive instructions and to enable processing of that job. In one embodiment, the job pool arbiter 240-1 may send a second request signal to the control block 289, which may cause the data in the new job queue 291 to be provided to the job pool arbiter 240-1.

In block 545, the job pool arbiter 240-1 may then provide a first index for the return instructions to the bus master 260 and a second index for the return data to the scheduler 270. In block 550, the job pool arbiter 240-1 may write (or store) the job (i.e., the data, instructions, and the state) to the job pool 250. In one embodiment, the job(s) may be stored into the job pool 250 and the position may be tracked by the safety position logic 230. In other embodiment, the job(s)

may be stored into the job pool 250 to hold the jobs, which are ready to run, until the job information is available so that the job information may be transferred to the slow path 280. In other embodiment, the job(s) may be stored into the job pool 250 to save the instructions for the job, which may be written to the stall queue 293, until more input data is available.

In block 555, the scheduler 270 may check if the received data and/or the instructions return event and control passes to block 560 and to block 555 otherwise. In block 560, the scheduler arbiter 240-3 of the scheduler 270 may add the index of the job, which may be ready to run to a ready-to-run queue R-t-R 272.

In block 565, the scheduler arbiter 240-3 may determine the availability of execution units 281. In one embodiment, the scheduler arbiter 240-3 may check which one or more of the execution units 281 may be free to execute the job stored in the R-t-R 272. In one embodiment, control may pass to block 570 if at least one of the execution unit 281 is available and back to block 565 otherwise.

In block 570, the scheduler arbiter 240-3 may transfer or add the job to an input queue 520 within the execution unit 281-1, which may available for execution the job.

In block 572, the execution unit 281-1 may perform the job. In one embodiment, the processing engine 510 may execute the job. In block 575, the output queue 550 may check if additional job(s) are created as a result of executing the job and control passes to block 578 if additional jobs are created and to block 580 otherwise. In one embodiment, the output queue 550 may signal the feedback queue arbiter 240-2 if the additional jobs are created. In block 578, the feedback queue arbiter 240-2 may add the additional job to a fork queue 292 in response to receiving the signal from the output queue 550. In one embodiment, the jobs in the fork queue 292 may be executed using fork instructions. In one embodiment, the jobs in the fork queue 292 may be similar to the new jobs in the queue 291 except that the jobs in the fork queue 292 may be assigned a higher priority. In one embodiment, the fork instructions may include instructions similar to the conditional or un-conditional jump instructions except that such jump instructions may be performed by the new jobs while the original job may continue to perform the next sequential instruction following the fork instruction.

In block 580, the execution engine 281-1 may be exited after the completion of the job. In block 585, the feedback queue arbiter 240-2 may allocate the exited job to one of the feedback queues 290 such as the free list queue 296. In one embodiment, the feedback queue arbiter 240-2 may provide the fee job index of (a) the terminated jobs; and (b) the jobs sent to the overflow queue 294 to the free list FIFO. In block 595, the arbiter 240 may service the jobs in the feedback queue and the new jobs from the fast path 220.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A system comprising hardware circuitry, said system to process data units comprising:
   a fast path to determine if received input data units include at least a portion of a pattern, which, potentially, matches with at least one of predetermined pattern, and create one or more jobs if there exist a potential match, each of the one or more jobs associated with an input data unit and including at least data, instructions, and state information;
   a job pool arbiter to:
      allocate the one or more jobs for execution while providing a job state to be stored in a job pool,
      send a first request to a bus master to receive instructions to enable processing of the jobs; and
      send a second request to a control block to cause the one or more input data units in an input data buffer that are associated with the jobs to be provided to the job pool;
   a slow path including a plurality of execution units to process the jobs; and
   a scheduler to identify jobs from the one or more jobs that are ready to run;
   wherein the fast path and the slow path share the input data buffer to avoid copying the input data units for which a potential match exists.

2. The system of claim 1, further comprising a network interface to receive one or more data units.

3. The system of claim 1, further comprising an input data buffer.

4. The system of claim 1, further comprising a new job queue to store the one or more jobs.

5. The system of claim 1, wherein a processor includes the job pool arbiter to provide a first index for a return instruction to the bus master and a second index for a return data to the scheduler.

6. The system of claim 1, wherein a processor includes the scheduler to determine ready-to-run jobs based on a first index and a second index and availability of data and instructions to process the ready-to-run jobs, wherein the jobs include the ready-to-run jobs.

7. The system of claim 6, wherein the scheduler further includes a scheduler arbiter and a ready to run queue, wherein the scheduler includes the scheduler arbiter to store the ready-to-run jobs in the ready to run queue and then send the ready-to-run jobs to an available execution unit.

8. The system of claim 7, wherein the available execution unit further includes an input queue, an output queue, and a processing element, wherein the available execution unit includes the processing element to retrieve the ready-to-run jobs from the input queue, process the ready-to-run jobs, and store resulting records into the output queue.

9. The system of claim 8, wherein the available execution unit includes the processing element.

10. The system of claim 9 further includes a feedback queue arbiter to, store the additional jobs into a fork queue, the stalled jobs into a stalled jobs queue, overflow jobs into a overflow queue, instruction jobs into an instructions queue, and exited jobs into a free-list queue.

11. A computer-implemented method to process data units in a computer system, comprising:
   determining a remaining capacity of the input data buffer,
   storing the one or more data units in an input data buffer,
   determining, in a fast path, if the input data units include at least a portion of a pattern, which, potentially, matches with at least one of predetermined pattern, and create one or more jobs if there exist a potential match, each of the one or more jobs associated with an input data unit and including at least data, instructions, and state information;
   allocating the one or more jobs for execution, using a job pool arbiter, while providing a job state to be stored in a job pool, sending a first request to a bus master to receive instructions to enable processing of the jobs;
sending a second request to a control block to cause the one or more input data units in the input data buffer that are associated with the jobs to be provided to the job pool;
identifying jobs from the one or more jobs that are ready to run;
processing jobs in a slow path, which includes a plurality of execution units,
sharing the input data buffer between the fast path and the slow path to avoid copying the input data units for which a potential match exists.

12. The method of claim 11, further comprising receiving one or more data units.

13. The method of claim 11, further comprising storing the one or more jobs in a new job queue.

14. The method of claim 11, further comprising providing a first index for a return instruction to the bus master and a second index for a return data to a scheduler.

15. The method of claim 11, further comprising determining ready-to-run jobs based on the first index and the second index and availability of data and instructions to process the ready-to-run jobs, wherein the jobs include the ready-to-run jobs.

16. The method of claim 15, further comprising storing the ready-to-run jobs in a ready to run queue and then sending the ready-to-run jobs to an available execution unit.

17. The method of claim 16, further comprising retrieving the ready-to-run jobs from the input queue, processing the ready-to-run jobs, and storing resulting records into the output queue.

18. The method of claim 17, further comprising creating additional jobs, stalled jobs, overflow jobs, instruction jobs, or exited jobs in response to processing the ready-to-run jobs.

19. The method of claim 18, further comprising storing the additional jobs into a fork queue, the stalled jobs into a stalled jobs queue, overflow jobs into an overflow queue, instruction jobs into an instructions queue, and exited jobs into a free-list queue.

20. A system comprising a processor to process data units comprising:
fast path means for determining if received input data units include at least a portion of a pattern, which, potentially, matches with at least one of predetermined pattern, and creating one or more jobs if there exist a potential match, each of the one or more jobs associated with an input data unit and including at least data, instructions, and state information;
job pool arbiter means for:
allocating the one or more jobs for execution while providing a job state to be stored in a job pool,
sending a first request to a bus master to receive instructions to enable processing of the jobs; and
sending a second request to a control block to cause the one or more input data units in an input data buffer that are associated with the jobs to be provided to the job pool;
slow path means for processing the jobs; and
scheduler means for identifying jobs from the one or more jobs that are ready to run;
wherein the fast path means and the slow path means share the input data buffer to avoid copying the input data units for which a potential match exists.

21. The system of claim 20, wherein the scheduler means is further configured to determine ready-to-run jobs based on a first index and a second index and availability of data and instructions to process the ready-to-run jobs, wherein the jobs include the ready-to-run jobs.

22. The system of claim 21, wherein the scheduler means further includes a scheduler arbiter and a ready to run queue, wherein the scheduler means includes the scheduler arbiter to store the ready-to-run jobs in the ready to run queue and then send the ready-to-run jobs to an available execution unit.

23. The system of claim 22, wherein the available execution unit further includes an input queue, an output queue, and a processing element, wherein the available execution unit includes the processing element to retrieve the ready-to-run jobs from the input queue, process the ready-to-run jobs, and store resulting records into the output queue.

24. The system of claim 23, further including a feedback queue arbiter to, store the additional jobs into a fork queue, the stalled jobs into a stalled jobs queue, overflow jobs into a overflow queue, instruction jobs into an instructions queue, and exited jobs into a free-list queue.

25. One or more non-transitory computer readable memories which store, in combination or singularly, instructions that, when executed by a one or more computers, cause the one or more computers to perform operations for processing data units, said operations comprising:
determining a remaining capacity of the input data buffer,
storing the one or more data units in an input data buffer,
determining, in a fast path, if the input data units include at least a portion of a pattern, which, potentially, matches with at least one of predetermined pattern, and create one or more jobs if there exist a potential match, each of the one or more jobs associated with an input data unit and including at least data, instructions, and state information;
allocating the one or more jobs for execution, using a job pool arbiter, while providing a job state to be stored in a job pool,
sending a first request to a bus master to receive instructions to enable processing of the jobs;
sending a second request to a control block to cause the one or more input data units in the input data buffer that are associated with the jobs to be provided to the job pool;
identifying jobs from the one or more jobs that are ready to run;
processing jobs in a slow path, which includes a plurality of execution units,
sharing the input data buffer between the fast path and the slow path to avoid copying the input data units for which a potential match exists.

26. The one or more non-transitory computer readable memories of claim 25, further comprising determining ready-to-run jobs based on the first index and the second index and availability of data and instructions to process the ready-to-run jobs, wherein the jobs include the ready-to-run jobs.

27. The one or more non-transitory computer readable memories of claim 26, further comprising storing the ready-to-run jobs in a ready to run queue and then sending the ready-to-run jobs to an available execution unit.

28. The one or more non-transitory computer readable memories of claim 27, further comprising retrieving the ready-to-run jobs from the input queue, processing the ready-to-run jobs, and storing resulting records into the output queue.

29. The one or more non-transitory computer readable memories of claim 28, further comprising storing additional jobs into a fork queue, stalled jobs into a stalled jobs queue, overflow jobs into an overflow queue, instruction jobs into an instructions queue, and exited jobs into a free-list queue.

* * * * *